(No Model.) 3 Sheets—Sheet 1.
D. ASHWORTH.
VALVE GEAR FOR STEAM ENGINES.
No. 554,855. Patented Feb. 18, 1896.
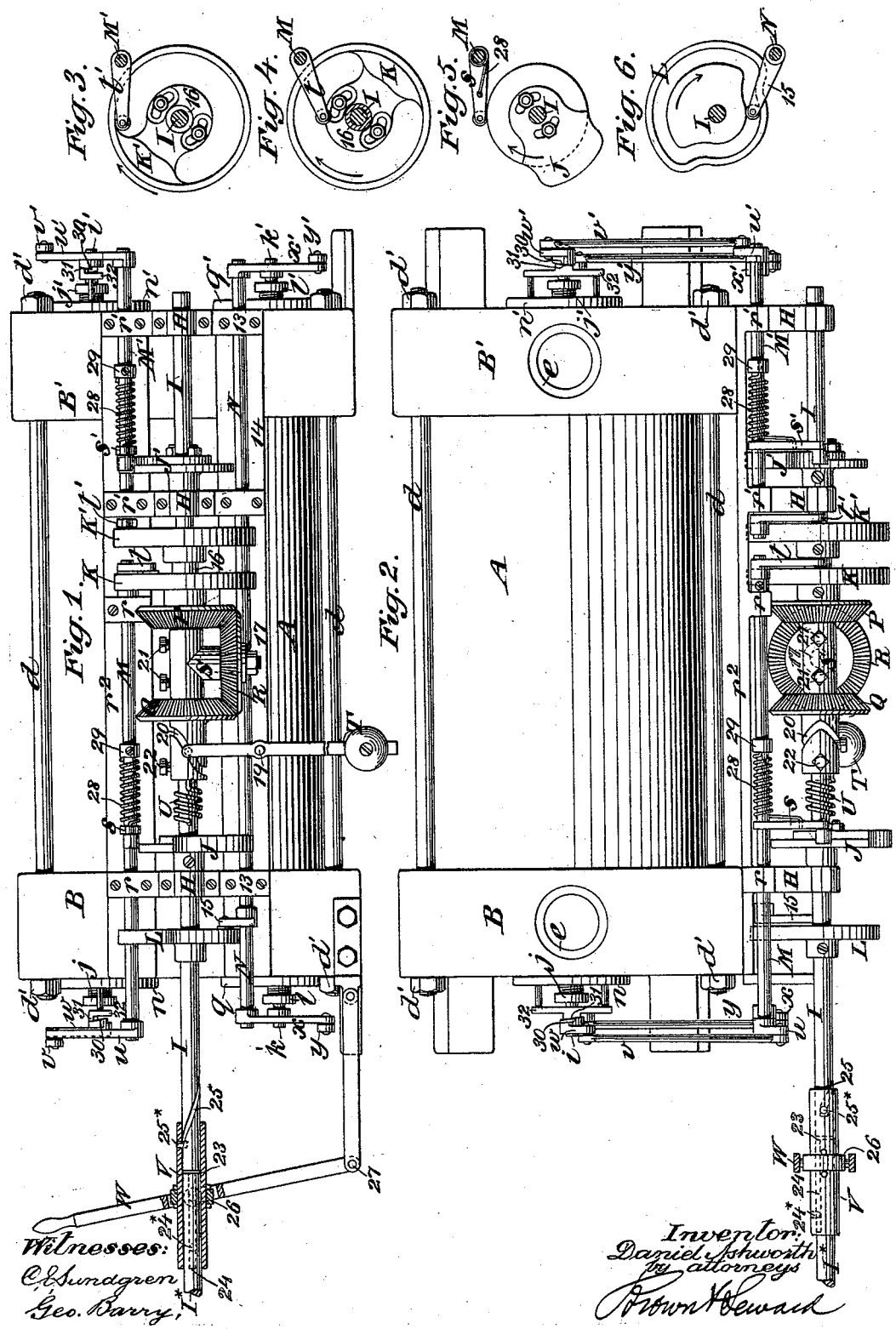
Witnesses:
C. E. Sundgren
Geo. Barry
Inventor:
Daniel Ashworth
by attorneys
Brown & Seward (No Model.) 3 Sheets—Sheet 2.
D. ASHWORTH.
VALVE GEAR FOR STEAM ENGINES.
No. 554,855. Patented Feb. 18, 1896.
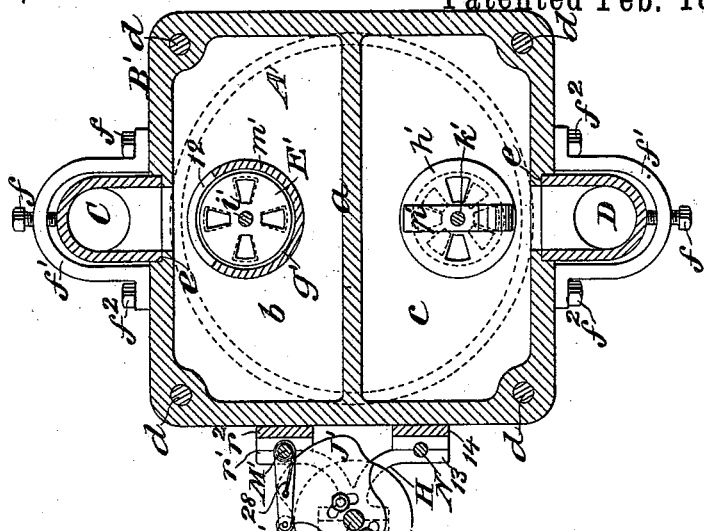
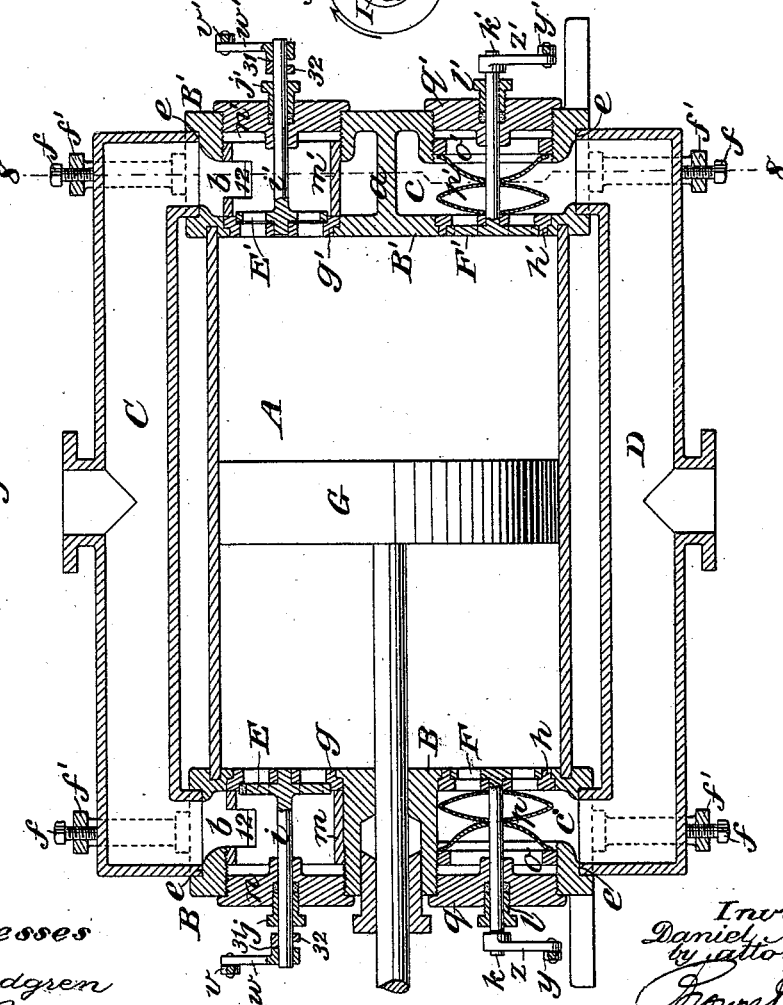
Witnesses
C. E. Sundgren
Geo. Barry.
Inventor
Daniel Ashworth
by attorneys
Brown & Seward (No Model.)   3 Sheets—Sheet 3.
D. ASHWORTH.
VALVE GEAR FOR STEAM ENGINES.
No. 554,855.   Patented Feb. 18, 1896.
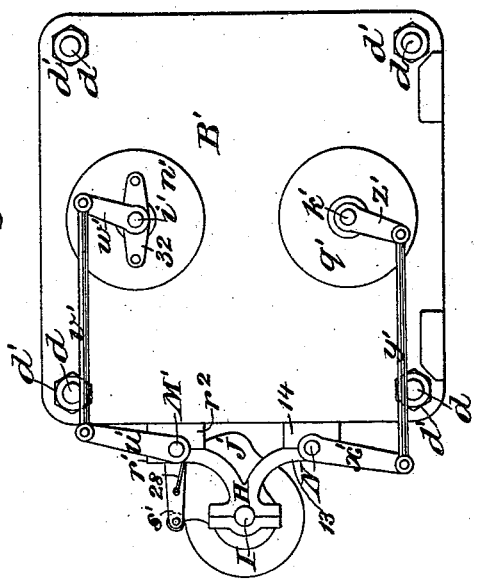
Witnesses:
C. F. Sundgren
Geo. Barry.
Inventor:
Daniel Ashworth
by attorneys
Brown & Seward

UNITED STATES PATENT OFFICE.

DANIEL ASHWORTH, OF WAPPINGER'S FALLS, NEW YORK.

VALVE-GEAR FOR STEAM-ENGINES.

SPECIFICATION forming part of Letters Patent No. 554,855, dated February 18, 1896.

Application filed June 21, 1895. Serial No. 553,554. (No model.)

*To all whom it may concern:*

Be it known that I, DANIEL ASHWORTH, of Wappinger's Falls, in the county of Dutchess and State of New York, have invented a new and useful Improvement in Valve-Gear for Engines, of which the following is a specification.

This invention relates to valve-gear for engines the valves of which are located in the ends of the cylinder and which are operated by a rotary cam-shaft arranged lengthwise of the cylinder and acting through rock-shafts and connections on arms on the valve-stems to produce the necessary movements of the valves to effect the induction and eduction of the steam or other motive fluid to and from the cylinder and to provide for variations in the cut off.

I will proceed to describe the improvement with reference to the accompanying drawings and afterward point out its novelty in claims.

Figure 1 represents a side view of the cylinder and valve-gear of a steam-engine embodying my invention. Fig. 2 is a plan view of the same. Figs. 3, 4, 5, and 6 are side views of cams by which the operations of the valves are produced. Fig. 7 represents a central longitudinal vertical sectional view of the cylinder and the valves. Fig. 8 represents a transverse vertical section taken in the line 8 8 of Fig. 7. Fig. 9 represents a rear end view of the cylinder and of the valve-gear.

Similar letters and numerals of reference designate corresponding parts in all the figures.

The cylinder A is provided with two hollow heads B B' each of which is divided by a partition $a$ into two chambers $b$ and $c$, of which the upper one, $b$, is an induction-chamber and the lower one, $c$, is an eduction-chamber. The said heads are secured to the cylinder by bolts $d\,d$ extending along the outside of the cylinder and passing through both heads, outside of which they are fitted with nuts $d'\,d'$. The two induction-chambers $b\,b$ have connected with them the two branches of the steam-pipe C and the two eduction-chambers $c\,c$ have connected with them the two branches of the exhaust-pipe D. The induction and exhaust pipes C and D are represented as having their ends fitted into seats $e$ in the cylinder-heads and as secured in said seats by screws $f$ which are screwed through arched brackets $f'$ which straddle the pipes and are bolted to the cylinder-heads by bolts $f^2$.

E E' are the induction-valves, one for each end of the cylinder, fitted to seats $g\,g'$ between the induction-chambers $b$ and the cylinder.

F F' are the eduction-valves, one for each eduction-chamber $c$, fitted to seats $h\,h'$ between the said chambers and the cylinder. These valves are all represented as what are known as "disk valves," having radial openings corresponding with similar openings in the seats.

The stems $i\,i'$ of the induction-valves extend through stuffing-boxes $j\,j'$ provided in the outer walls of their chambers $b$, and the stems $k\,k'$ of the eduction-valves F F' extend through stuffing-boxes $l\,l'$ in the outer walls of their respective chambers $c$.

The induction-valves E E' are on the outer sides of their seats $g\,g'$. The said seats are held in place by thimbles $m\,m'$, screwed in through the outer walls of the cylinder-heads, the said thimbles having openings 12 for the entrance of steam from the chambers $b\,b$. Space enough is left outside of the said thimbles for the screwing in of caps $n\,n'$, which contain the stuffing-boxes $j\,j'$.

The eduction-valves F F' are on the cylinder sides of their seats, in which they are countersunk to be flush with the inner faces of the cylinder-heads. The eduction-valve seats $h\,h'$ are fitted loosely to bearings provided for them in the inner walls of the cylinder-heads and are held in place by rings $o\,o'$, which are screwed into the outer walls of the cylinder-heads and between which and the valve-seats there are applied springs $p\,p'$, which will allow the valve-seats to give way and move slightly outward in case of any obstruction occurring between the piston G and the eduction-valves. Space enough is left outside of the rings $o\,o'$ for the screwing into the cylinder-heads of the caps $q\,q'$, which contain the stuffing-boxes of the valve-stems $k\,k'$.

Parallel with the length of the cylinder a rotary cam-shaft I is arranged in bearings in brackets H H, bolted to the cylinder-heads. This cam-shaft is to be geared in any suitable manner with the crank-shaft of the engine to produce its continuous revolution. The said shaft carries five cams—viz., two J J' for opening the two induction-valves respectively, two K K' for closing the said valves respectively and cutting off the steam, and one L for opening and closing both eduction-valves.

The cams J and K act upon the stem $i$ of the induction-valve E through a rock-shaft M, arranged parallel with the cylinder in bearings $r\ r$ on a string-piece $r^2$, bolted to the cylinder-heads, the said rock-shaft being furnished with an arm $s$ for the action upon it of the cam J and an arm $t$ for the action upon it of the cam K, and also furnished with a third arm $u$, which is connected by a rod $v$ with an arm $w$ on the valve-stem. A separate rock-shaft M' (represented as arranged in line with M and working in bearings $r'\ r'$ on the string-piece $r^2$) is employed for the induction-valve E', the said rock-shaft being furnished with an arm $s'$ for the action upon it of the cam J', an arm $t'$ for the action upon it of the cam K', and a third arm $u'$, connected by a rod $v'$ with an arm $w'$ on the valve-stem $i'$. The cam L acts upon the stems $k\ k'$ of both eduction-valves through one rock-shaft N, which is arranged parallel with the cylinder in bearings 13 in a string-piece 14 bolted to the cylinder-heads, the said rock-shaft being furnished with an arm 15 to engage with the cam L and with arms $x\ x'$, which are connected respectively by rods $y\ y'$ with arms $z\ z'$ on the respective eduction-valve stems $k\ k'$.

To provide for varying the times of closing the induction-valves and the points in the stroke of the piston at which steam is to be cut off the cams K K' are movable around the shaft I, and for this purpose they are both fastened to the same sleeve 16 with a bevel-gear P, which forms part of the variable-cut-off gear, the said cams and the said gear being capable of turning together on the said shaft. The other parts of the variable-cut-off gear consist of a bevel-gear Q fitted to the shaft I, and either fast or loose thereon, as will be presently described, and a third bevel-gear R, which is fitted to turn on a journal 17 on the end of an arm S, which is carried by and projects laterally from the said shaft I, the said gear R gearing with the two bevel-gears P and Q, these two being of the same size, but the size of R being immaterial. The gear Q is driven by the cam-shaft I and drives the gear P and the cut-off cams K K' through the gear R, as will be presently described.

The system of bevel-gears above described between the cam-shaft and cams permits the employment of a governor of suitable kind for the purpose of governing the speed of the engine by cutting off sooner or later in the stroke, such governor being applied to the driving bevel-gear Q. In the example represented I have shown (see Figs. 1 and 2) a governor consisting of an oscillating pendulum T swinging on a fixed pivot 19, and driven by the engagement of its rod in the endless groove of a cam 20, which is fastened to the said bevel-gear and which with the said bevel-gear are so fitted to the cam-shaft I as to be capable of turning some distance thereon under the control of a coil-spring U, which surrounds the said shaft, and one end of which is fast to the said shaft and its other end to the said cam, the shaft driving the bevel-gear and cam through this spring. When the governor is used, the arm S carrying the bevel-gear R is fastened to the cam-shaft in any suitable manner, as by set-screws 21 screwed through its hub.

The governor operates as follows: So long as the engine runs at the speed for which the governor is set the three bevel-gears rotate as a fixture with the shaft, the bevel-gear R having no movement about its axis; but in case of any tendency of the speed of the engine to increase the corresponding increase in the speed of the cam-shaft would carry forward the arm S and the bevel-gear R, which latter would then turn on its axis in a direction to cause the bevel-gear P to turn forward on the shaft and advance the cut-off cams thereon, so that they would close the induction-valves earlier in the stroke of the piston, or in case of any tendency to diminish the speed of the engine an action would take place between the three bevel-gears the reverse of that described and the cut-off cams K K' would be turned backward on the shaft and the cut off would take place later on in the stroke.

If it should be desired to use the engine without the governor, the arm S would be loosened from the shaft and the bevel-gear Q be fastened tightly thereto by suitable means, as by set-screws 22, and the arm S would be loosened from the shaft and made fast to any fixed object. The gear Q would then by turning the gear R on the arm S drive the gear P and the cut-off cams in the opposite direction, and according to where the arm S would be held the cut-off cams would occupy more or less forward positions and close the valves sooner or later.

To provide for reversing the engine the shaft I is divided at 23 into two lengths or sections, which are coupled together by a coupling-sleeve V. All the cams and the cut-off mechanism are on the section I of the said shaft which appears at the right of the division 23 in Figs. 1 and 2. The gearing for driving the shaft is to be applied to the section I* at the left hand of the division 23. The two sections I I* have in them grooves 24 25 at different angles in which are received pins 24* 25*, which are secured in the sleeve and project inwardly therefrom. In the example represented the groove 24 is straight and the groove 25 is inclined or spiral. The coupling V is fitted with a collar 26, in which it is free to turn, but with which it is compelled to move longitudinally, and to this collar is connected a reversing-lever W, working on a fulcrum 27. This lever is represented as furnished with a handle to be operated by hand. By moving the said lever and thereby moving the coupling V lengthwise of the shaft the section I, carrying the cams, is turned in one direction or the other relatively to the driving-section I*, and by moving the lever a proper distance the section I is brought to either of two positions for going ahead or reversing, respectively.

In order to prevent any interference between the operations of the cams and mechanism for opening the induction-valves and the cams and mechanism for closing them to cut off the steam the arms $s\ s'$, provided on the shafts M M' for opening the said valves, are fitted loosely to the said shafts and connected therewith by coil-springs 28, one end of each spring being connected to its respective shaft by a collar 29, fastened to the shaft, and the other end of each being connected with its respective arm $s$ or $s'$. Hence if the cut-off cams K K' should be so far advanced as to be closing the valve at the same time that the opening-cams J J' would have a tendency to keep them open, the springs 28 would yield and leave the valves free to be acted upon by the cut-off cams.

In order to prevent or reduce friction between the induction-valves E E' and their seats there is provided on the inner face of the hub of each of the arms $w\ w'$ of the valve-stems $i\ i'$ a spiral-faced cam 30, and corresponding stationary spiral-faced cams 31 are provided on yokes 32, secured to the cylinder-heads. As the valves turn in a direction to open, the cams 30 on the valve-stems working against the stationary cams 31 raise them from their seats. When the valves are turned to the closing position, they are seated by the pressure of the steam.

It will be understood by the foregoing description that in carrying out my invention provision is made for the working of the valves with the least practicable amount of friction. Provision is also made for the yielding of the eduction-valves and their seats to any obstruction that may be interposed between the piston and the cylinder-head. Provision is also afforded for the removal of the valves for regrinding and repair by taking out the caps $n\ n'\ q\ q'$ and the thimbles $m\ m'$ and rings $o\ o'$.

What I claim as my invention is—

1. The combination with the cylinder having hollow heads in which are provided induction-chambers, of valves between said chambers and the cylinder, a rotary shaft arranged parallel with the length of the cylinder, cams on said shaft for opening the said valves, and other cams upon said shaft for closing said valves, substantially as herein described.

2. The combination with the cylinder having hollow heads in which are provided induction-chambers, of valves between said chambers and the cylinder, a rotary shaft arranged parallel with the length of the cylinder, cams on said shaft for opening said valves, and other cams movable forward or backward on said shaft for closing the said valves, substantially as herein set forth.

3. The combination with the cylinder having hollow heads in which are provided eduction-chambers, of oscillating valves between said chambers and the cylinder, a rock-shaft arranged parallel with the length of the cylinder, connections between said rock-shaft and valves to produce both the opening and closing movements of the valves, a rotary shaft arranged parallel with the length of the cylinder, and a cam on said rotary shaft for actuating said rock-shaft, substantially as herein described.

4. The combination with the cylinder having hollow heads in which are formed induction and eduction chambers, of induction-valves between said induction-chambers and the cylinder, eduction-valves between said eduction-chambers and the cylinder, a rotary shaft arranged parallel with the length of the cylinder, cams on said shaft for opening the induction-valves, cams on said shaft for closing the induction-valves and a cam on said shaft for opening and closing the eduction-valves, substantially as herein described.

5. The combination with the cylinder and separate induction-valves for opposite ends thereof, of a rotary cam-shaft, cams on said shaft for closing said valves, a bevel-gear upon said shaft attached to said cams and movable therewith backward and forward upon and around said shaft, a second bevel-gear on said shaft, and a third bevel-gear which is carried by an arm projecting laterally from said shaft and through which the said second bevel-gear drives the first-mentioned bevel-gear and said cams, substantially as herein set forth.

6. The combination with the cylinder and separate induction-valves for opposite ends thereof, of a rotary cam-shaft, cams on said shaft for closing said valves, a bevel-gear upon said shaft attached to said cams and movable therewith backward and forward on said shaft, a second bevel-gear fitted to said shaft, a spring through which said second bevel-gear is driven by said shaft, a third bevel-gear which is carried by an arm projecting laterally from said shaft and through which the said second bevel-gear drives the first-mentioned bevel-gear, and a governor connected with said third bevel-gear for controlling the speed thereof, substantially as herein set forth.

7. The combination with the cylinder having hollow heads in which are provided induction-chambers, of valves and seats therefor between said chambers and the cylinder, cams on the stems of said valves, and stationary cams against which the first-mentioned cams operate to withdraw the said valves from their seats by their turning action in opening, substantially as herein described.

8. The combination with the cylinder and separate induction-valves for opposite ends thereof, of a rotary cam-shaft, opening-cams on said shaft for opening the said valves, closing-cams movable upon and around said shaft for closing the said valves and varying the cut off, and springs between said opening-cams and the said valves to prevent the interference of the operation of said opening-cams with that of said closing-cams, substantially as herein described.

DANIEL ASHWORTH.

Witnesses:
WILLIAM HALLIWELL,
DAVID MOORE.